United States Patent [19]
Lee et al.

[11] Patent Number: 5,793,348
[45] Date of Patent: Aug. 11, 1998

[54] ACTUATED MIRROR ARRAY DRIVING CIRCUIT HAVING A DAC

[75] Inventors: Geun-Woo Lee; Sang-Kyoung Woo, both of Seoul, Rep. of Korea

[73] Assignee: Daewoo Electronics Co., Ltd., Seoul, Rep. of Korea

[21] Appl. No.: 556,112

[22] Filed: Nov. 9, 1995

[30] Foreign Application Priority Data

Nov. 11, 1994 [KR] Rep. of Korea .................. 94-29494

[51] Int. Cl.$^6$ .................................................. G09G 3/36
[52] U.S. Cl. ........................................ 345/98; 345/100
[58] Field of Search ............................. 345/87, 89, 98, 345/99, 100, 103, 204, 208; 348/790, 792

[56] References Cited

U.S. PATENT DOCUMENTS

| | | |
|---|---|---|
| 5,035,475 | 7/1991 | Lee et al. . |
| 5,138,309 | 8/1992 | Wonzalez et al. . |
| 5,363,118 | 11/1994 | Okumura . |
| 5,604,510 | 2/1997 | Blanchard ......................... 348/98 |

FOREIGN PATENT DOCUMENTS

| | | |
|---|---|---|
| 0 433 054 | 6/1991 | European Pat. Off. . |
| 0 530 761 | 3/1993 | European Pat. Off. . |
| 0535569 | 4/1993 | European Pat. Off. . |
| 0612184 | 8/1994 | European Pat. Off. . |
| 26 06 596 | 8/1977 | Germany . |
| 92/21122 | 11/1992 | WIPO . |

*Primary Examiner*—Regina Liang
*Attorney, Agent, or Firm*—Pennie & Edmonds LLP

[57] ABSTRACT

A circuit for driving a number of actuated mirrors in a column in an actuated mirror array includes a sequential circuit for generating a sequential signal, a corresponding number of latches and a corresponding number of digital-analog converters, wherein a data signal is latched in sequence in each of the latches and each of the data signals latched in the latches is simultaneously provided to an analog-digital converter which converts the data signal into any one of many different gradation values over a given range.

3 Claims, 9 Drawing Sheets

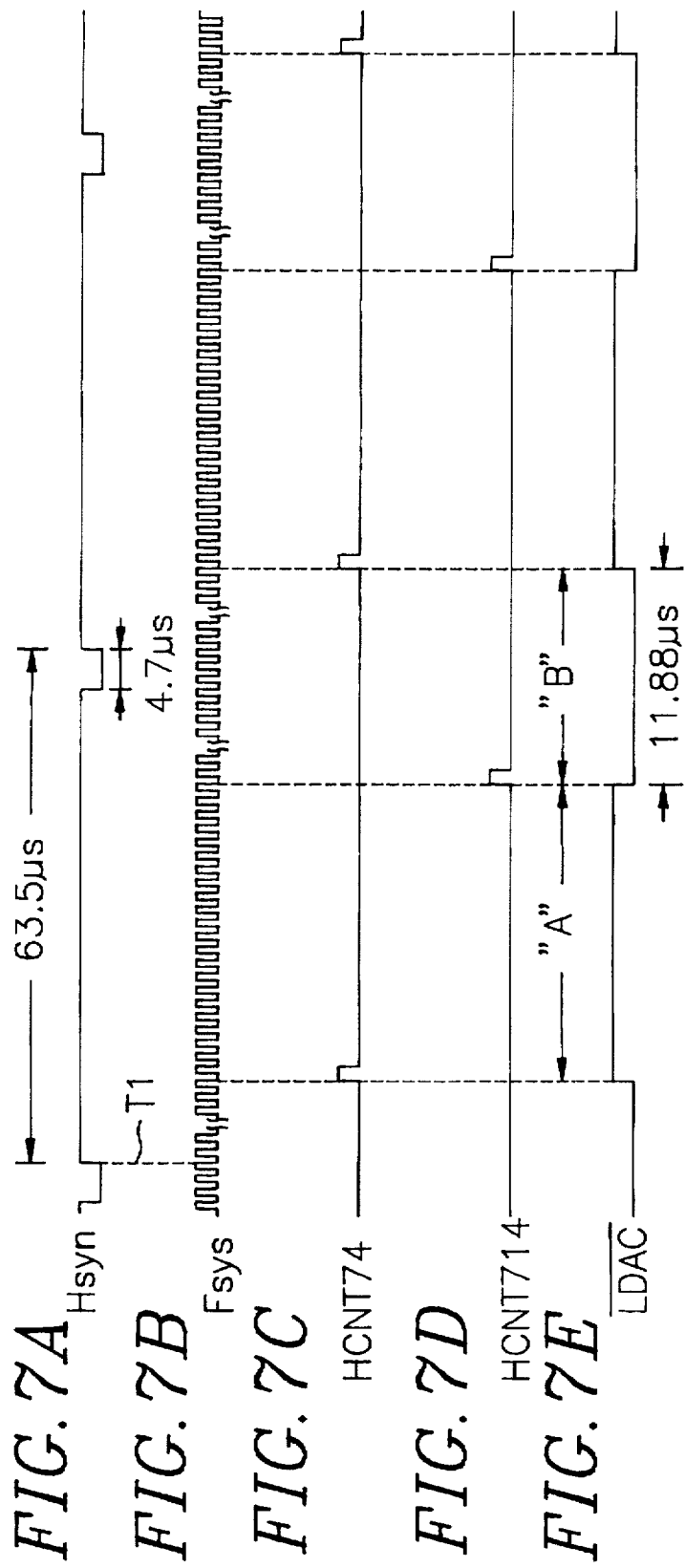

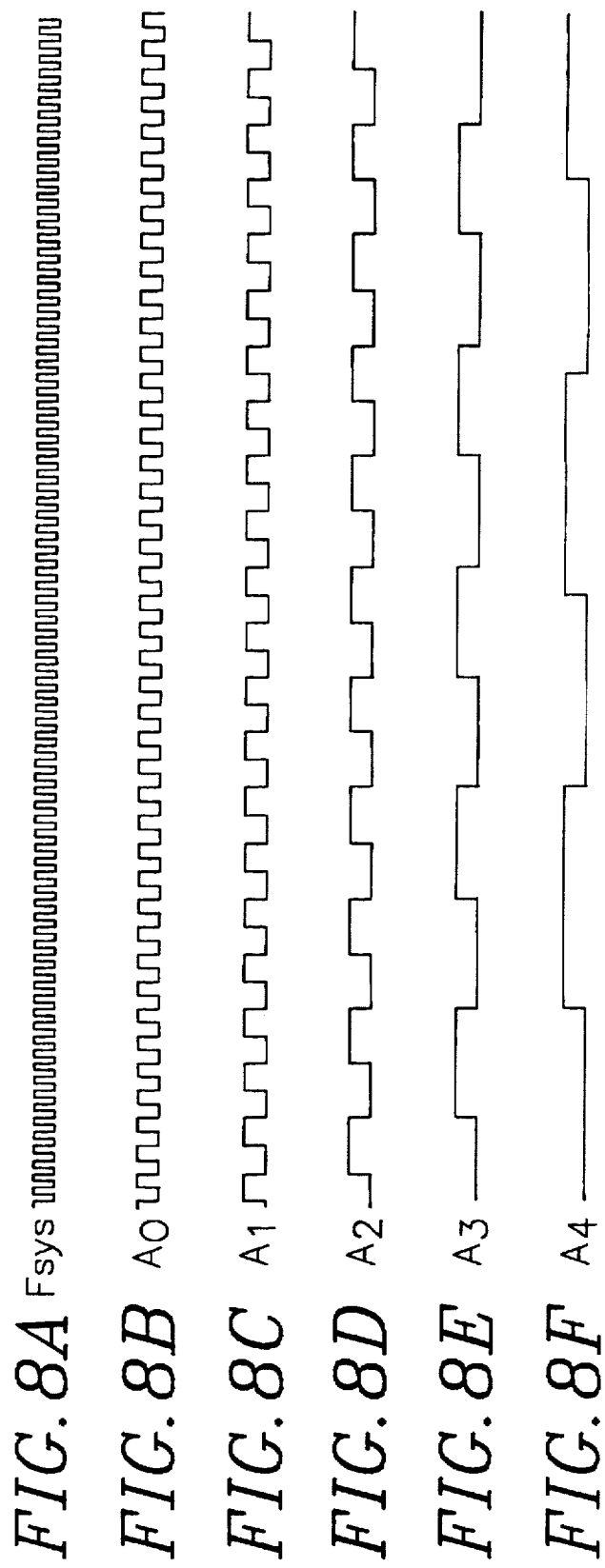

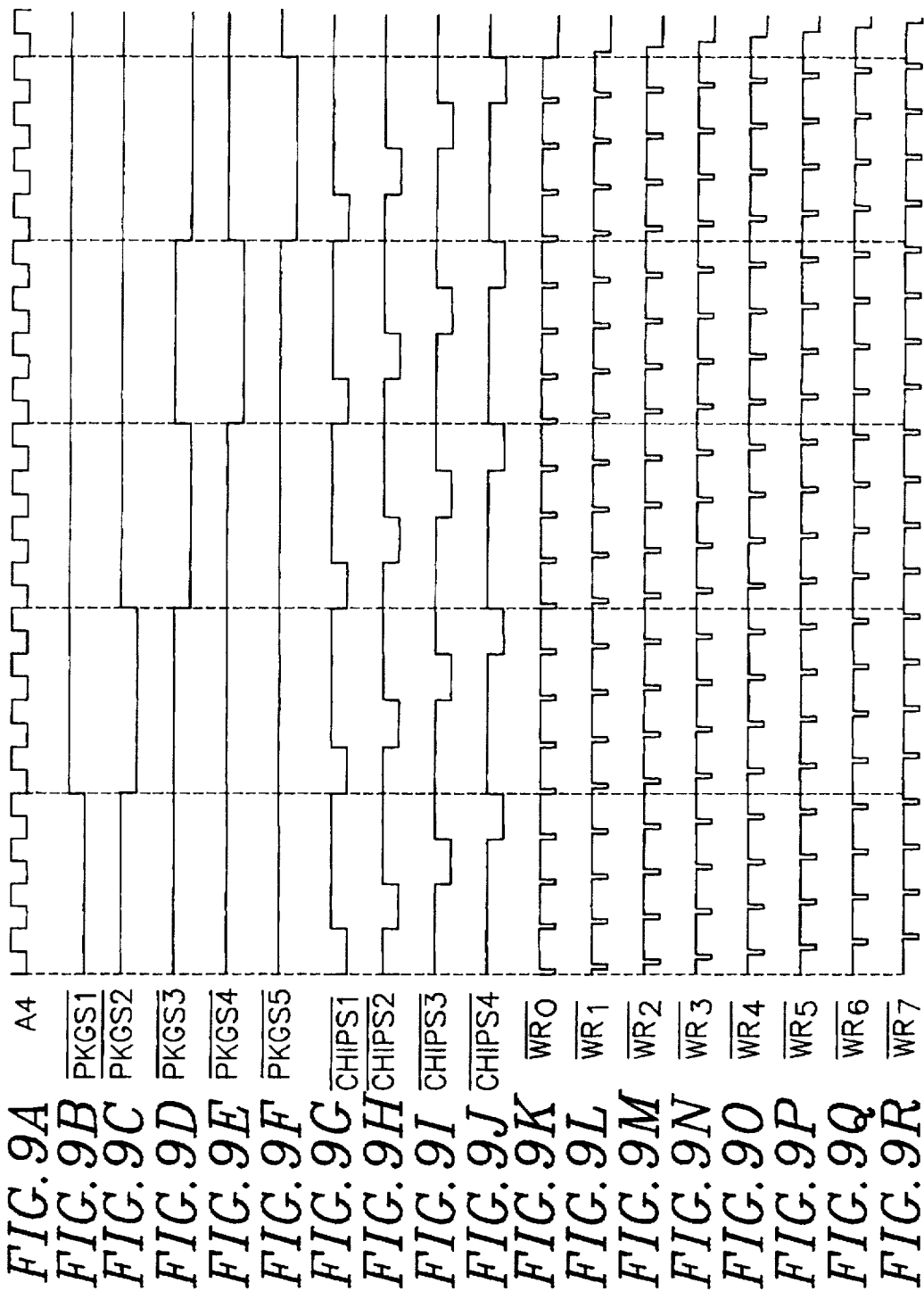

1

ACTUATED MIRROR ARRAY DRIVING CIRCUIT HAVING A DAC

FIELD OF THE INVENTION

The present invention relates to a driving circuit for an optical projection system; and, more particularly, to an actuated mirror array driving circuit incorporated therein a digital to analog converter ("DAC").

DESCRIPTION OF THE PRIOR ART

Among many display systems available in the art, an optical projection system is known to be capable of providing high quality images in a large scale. Two examples of such optical projection system are a liquid crystal display ("LCD") system employing a matrix of liquid crystal cells and an actuated mirror array ("AMA") system employing an array of actuated mirrors. Each of the liquid crystal cells and each of the actuated mirrors in the respective systems serve as a picture element ("pixel"), wherein the pixel represents a dot of an image to be displayed and is activated by a switching device such as a TFT (thin film transistor). The TFT is driven by a voltage signal derived from an image signal so that the dot has any one of a plurality of resolutions or gradations proportional to the magnitude of the voltage signal.

There is a number of TFT driving methods available in the art. One of them is a multiplexing technique, wherein one of a plurality of predetermined reference voltage levels is selected to give the resolution according to the level of the voltage signal. However, in this driving method, there must be an identical number of reference voltage levels to the number of gradations, thereby making the driving circuit complex and costly.

SUMMARY OF THE INVENTION

It is, therefore, a primary object of the present invention to provide an actuated mirror array driving circuit employing a DAC to efficiently achieve a gradation display.

In accordance with the present invention, there is provided a driving circuit for driving thin film actuated mirrors in a column in an array of M×N thin film actuated mirrors, wherein M and N are integers and indicate column and row in the array, respectively, each of the thin film actuated mirrors being used for reflecting a light beam incident thereupon, each of the thin film actuated mirrors being associated with a switching element, each of the thin film actuated mirrors deforming in response to a signal voltage applied thereto through the switching element as each of the switching elements in the same column is turned on to thereby cause a deviation in the optical path of the reflected light beam therefrom, the driving circuit comprising:

memory means for storing a video signal in the form of a digitized signal, the video signal having a plurality of line video signals, each of the line video signals being scanned in accordance with a scanning pulse, each of the line video signals being divided into said N number of n-bit data signals, each of the N number of the n-bit data signals being sequentially generated from the memory means;

means for deriving from the scanning pulse a clock pulse to drive each of said N number of thin film actuated mirrors in the same column;

means for deriving from the scanning pulse a data control signal having a first pulse followed by a second pulse, each of the first and the second pulses having an associated duration, wherein said N number of n-bit data signals is available during the duration of the first pulse;

means for generating an enable signal; and a plurality of driving means of a substantially identical construction, each of the driving means being sequentially enabled in accordance with the enable signal to individually drive a predetermined number of actuated mirrors within the same column so that it applies individually to the predetermined number of actuated mirrors a corresponding number of the n-bit data signals, wherein each of the driving means includes:

means for generating a sequential signal through the use of the scanning pulse together with the enable signal, the sequential signal being used to permit the corresponding number of n-bit data signals to be received in sequence;

means having a corresponding number of input latches, each of the input latches for temporarily storing one of the corresponding number of n-bit data signals in accordance with the sequential signal;

means having a corresponding number of transfer gates, each of the transfer gates, in synchronization with the transition from the first pulse to the second pulse, simultaneously outputting the n-bit data signal from each of the input latches;

means having a corresponding number of conversion means, each of the conversion means converting the n-bit data signal transferred from each of the transfer gates into an analog voltage quantity which is proportional to the value of the n-bit data signal; and means having a corresponding number of amplifying means, each of the amplifying means amplifying the analog voltage quantity to produce the signal voltage to be applied to each of the predetermined number of the actuated mirrors.

BRIEF DESCRIPTION OF THE DRAWINGS

The above and other objects and features of the present invention will become apparent from the following description of preferred embodiments, when taken in conjunction with the accompanying drawings, in which:

FIGS. 7, 8 and 9 are graphs showing waveforms of signals generated at various points in the column driving circuit.

DETAILED DESCRIPTION OF THE PREFERRED EMBODIMENTS

Figure 1:
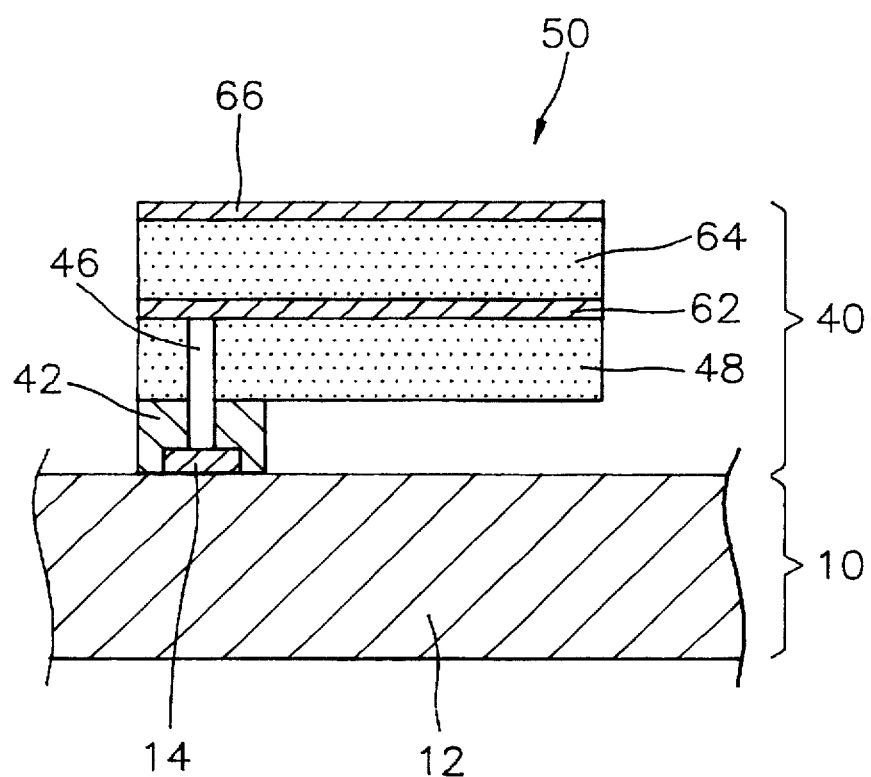
FIG. 1 presents a schematic view of an array of thin film actuated mirrors for use in an optical projection system.

Referring to FIG. 1, there is shown a schematic partial view of an array 50 of M×N thin film actuated mirrors ("AMA") 40 for use in an optical projection system, wherein M and N are integers, e.g., 640 and 480, and indicate row and column in the array 50, respectively.

The array 50, which is operated in a typical operating voltage ranging from 0 V to 15 V, comprises an active matrix 10 and an array 50 of M×N thin film actuated mirrors 40. The active matrix 10 includes a substrate 12, an array of M×N switching elements, e.g., TFTs (not shown), and an array of M×N connecting terminals 14.

Each of the thin film actuated mirrors 40 includes a supporting member 42 provided with a conduit 46, an elastic member 48, a first thin film electrode 62, a thin film electrodisplacive member 64 and a second thin film electrode 66. The first thin film electrode 62 made of an electrically conducting material is electrically connected to the switching element through the conduit 46 and the connecting terminal 14, thereby functioning as a signal electrode in the thin film actuated mirror 40. The thin film electrodisplacive member 64 is made of an electrodisplacive material such as a piezoelectric or an electrostrictive material which deforms in response to an electric field applied thereto. The second thin film electrode 66 made of an electrically conducting and light reflecting material functions as a mirror as well as a bias electrode in the thin film actuated mirror 40.

In such an AMA system, light from a lamp is uniformly illuminated onto the array 50 of the thin film actuated mirrors 40. The reflected light beam from the second thin film electrode 66 in each of the actuated mirrors 50 is incident upon an aperture of a baffle. By applying an electrical signal to each of the actuated mirrors 50, the relative position of the second thin film electrode 66 in each of the actuated mirrors 40 to the incident light beam is altered, thereby causing a deviation in the optical path of the reflected beam from the second thin film electrode 66 in each of the actuated mirrors 40. As the optical path of each of the reflected beams is varied, the amount of light reflected from the second thin film electrode 66 in each of the actuated mirrors 40 which passes through the aperture is changed, thereby modulating the intensity of the beam. The modulated beams through the aperture are transmitted onto a projection screen via an appropriate optical device such as a projection lens to thereby display an image thereon. One of the AMA systems is disclosed in a copending commonly owned application, U.S. Ser. No. 08/331,399, entitled "THIN FILM ACTUATED MIRROR ARRAY AND METHOD THE MANUFACTURE THEREOF", which is described herein by reference.

Figure 2:
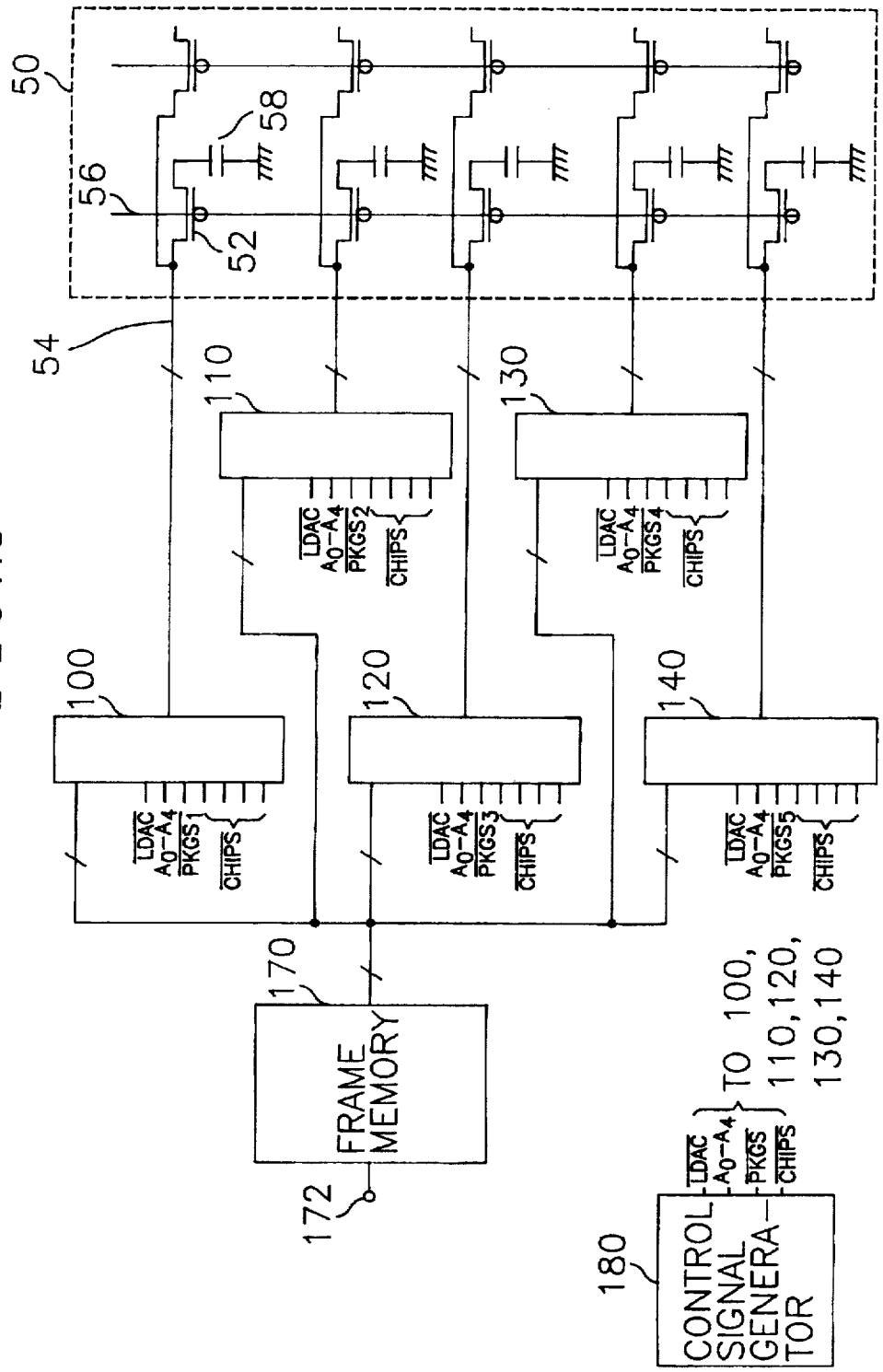
FIG. 2 shows a driver circuit for the AMA in accordance with the present invention.

Referring to FIG. 2, there is shown a block diagram of a driver circuit for the AMA 50, wherein the AMA 50 is shown to have a plurality of TFTs 52 which are arranged at the crossovers of data lines 54 and select lines 56. As each of the select lines 56 is sequentially selected, data signal is applied as the voltage signal to a signal line 54 which is individually associated with each row of thin film actuated mirrors 40 to thereby produce a horizontal video line of an image on the display.

The driver circuit comprises a frame memory 170 and five modular package ICs 100, 110, 120, 130, 140 having 128-channel of a substantially identical construction. A video signal in the form of a digitized data signal is fed to the frame memory 170 for the storage thereof through an input terminal 172. As well known in the art, the video signal comprises a plurality of horizontal line video signals being scanned in accordance with a scanning pulse. Each of the line video signals is divided into N number, i.e., 640, of digital signals, each of the digital signals having 8-bit data. The stored digital data signals are sequentially provided to the package ICs 110–140 frame memory 170.

Each of the five 128-channel package ICs 110–140 serves to individually actuate a predetermined number, e.g., 128, of thin film actuated mirrors 40 in a column, which will be further disclosed with reference to FIG. 2 hereinafter.

A variety of timing and control signals, which is generated from a control signal generator 180, employed to control the driver circuit as constructed in FIG. 2 is defined with reference to FIGS. 7, 8 and 9 as follows.

As well known in the art, in NTSC standard, a horizontal synchronization pulse "$H_{syn}$" has a period of about 63.5 µs, as shown in FIG. 7A, which corresponds to the time taken to scan a horizontal video line; and effective visual information is represented only for the duration of 51.6 µs. Assuming now that the number of thin film actuated mirrors 40 within a column is 640, a horizontal dot clock frequency "$F_{sys}$" necessary to drive a horizontal dot thin film actuated mirror becomes about 12.4 MHz (=640/51.6 µs), as shown in FIG. 7B.

In order to derive the interval of the effective visual information from the horizontal scanning time, there are used two short pulses, "HCNT74" and "HCNT714", as shown in FIGS. 7C and 7D. Each of the pulse HCNT74 and the pulse HCNT714 is generated at the time of 74th and 714th clock pulses of the horizontal dot clock pulse train counted from each of the starting points T1 of the scanning, respectively. An active high duration "A" having 640 dot clock pulses between the pulse HCNT74 and the pulse HCNT714, followed by an active low duration "B" for 11.88 µs, then, becomes a data control signal "/LDAC", as shown in FIG. 7E. During the duration A, 640 data signals as the effective visual information are available in the package ICs 110 to 150; while during the duration B, the latched 640 data signals are output from the package ICs at a time in order to drive simultaneously the 640 thin film actuated mirrors in a column.

The horizontal dot clock frequency $F_{sys}$ is divided by a factor 2 to form an address signal A0 as shown in FIG. 8A; the address signal A0 is divided by a factor 2 to from an address signal A1 as shown in FIG. 8B; the address signal A1 is divided by a factor 2 to form an address signal A2, as shown in FIG. 8C; the address signal A2 is divided by a factor 2 to form an address signal A3 as shown in FIG. 8D; and the address signal A3 is divided by a factor 2 to form an address signal A4 as shown in FIG. 8E.

Active low package selection signals, /PKGS1, /PKGS2, /PKGS3, /PKGS4, /PKGS5, as shown in FIGS. 9A to 9E, are used to sequentially enable the package ICs, respectively.

Figure 3:
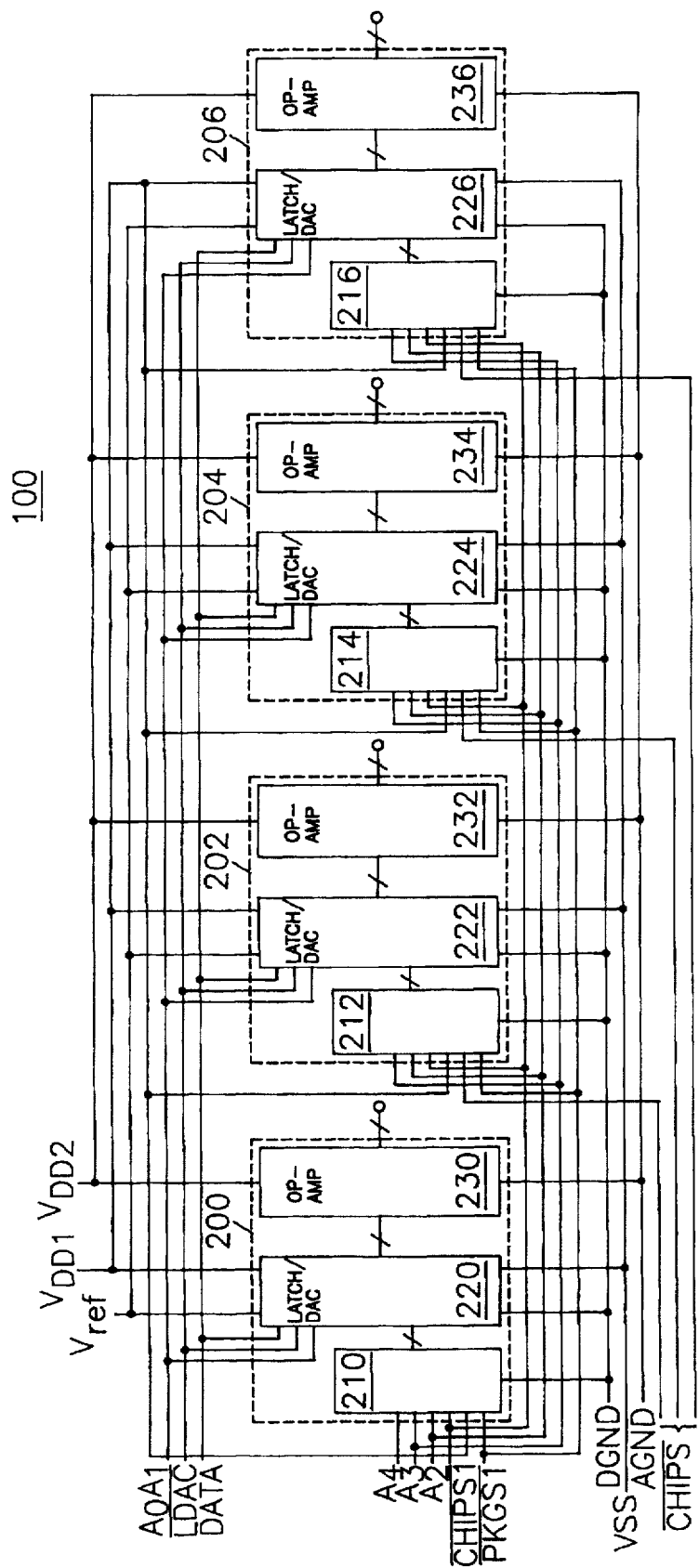
FIG. 3 illustrates a detailed lay out of any one of the driving package shown in FIG. 2.

FIG. 3 represents a detailed construction of the package ICs shown in FIG. 1, wherein only one package IC, e.g., 100 is shown. The package IC 100 includes four 32-channel thin film actuated mirror driving modules 200, 202, 204, 206 of a substantially identical construction; and, in turn, each of the driving modules 200, 202, 204, 206 includes three sections, i.e. a decoder 210, 212, 214, 216, a latch section 220, 222, 224, 226 and a DAC and OP-AMP section 230, 232, 234, 236, respectively.

In accordance with the invention, the decoder, the latch section and the DAC and OP-AMP section in each of the four modules 200, 202, 204, 206 can be integrally fabricated into one hybrid IC chip; and, in turn, the four hybrid IC chips can be integrally fabricated into a package IC as shown in FIG. 2 through the use of MCM (multi chip module) technique.

Figure 4:
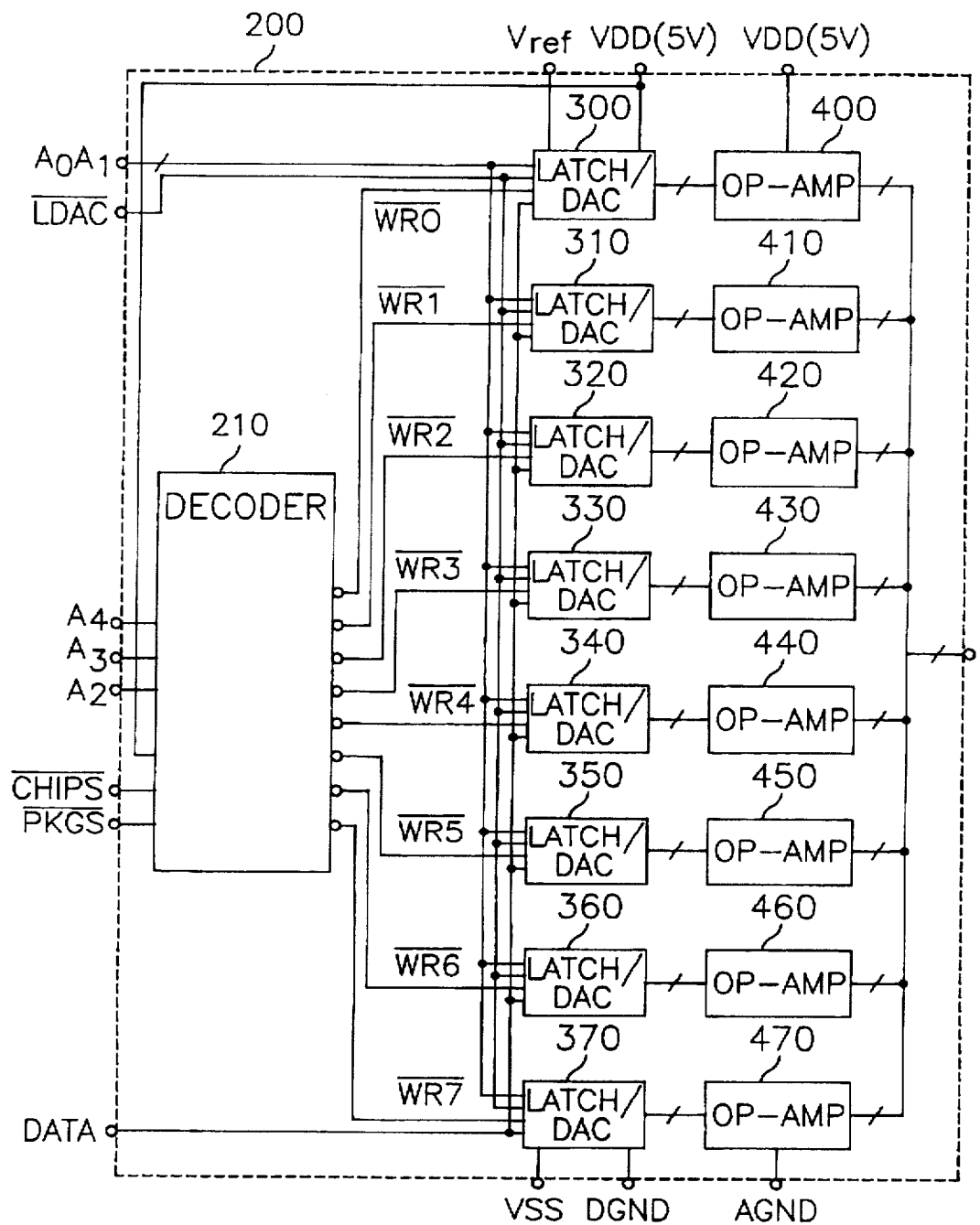
FIG. 4 represents a detailed construction of any one of the driving module shown in FIG. 3.

Furthermore, referring to FIG. 4, there is illustrated a detailed construction of one, e.g., 200 of the driving modules shown in FIG. 2.

The latch/DAC section 220 includes eight latch circuits 300 to 370 and the DAC and OP-AMP section 230 include eight of DAC and OP-AMP circuits 400 to 470, respectively.

The decoders, 210 to 216, are sequentially enabled by a set of active low chip selection signals, /CHIPS1, /CHIPS2, /CHIPS3, /CHIPS4, as shown in FIGS. 9F to 9I together with the package selection signals. The address signals A2A3A4 connected to the decoder 210 are used to determine which latch circuits will be selected to receive 8-bit data inputs on a data bus "DATA". The decoder 210, in response to the address signals A2A3A4, produces sequentially eight latch enable signals, /WR0 to /WR7, as shown in FIGS. 9J to 9Q. The latch enable signals, /WR0 to /WR7, are fed to the latch circuits 300 to 370, respectively.

Each of the eight latch circuits, 300 to 370, temporarily stores four 8-bit data signals in sequence in accordance with the latch enable signals, /WR0 to /WR7, from the decoder 210 and simultaneously outputs the stored data signals to the eight DAC circuits and, in turn, eight OP-AMP circuits, 400 to 470, respectively.

Each of the eight DAC and OP-AMP circuits, 400 to 470, derives from the 8-bit data signals the signal voltages corresponding to the data signals to be applied to the thin film actuated mirrors 40, respectively.

Figure 5:
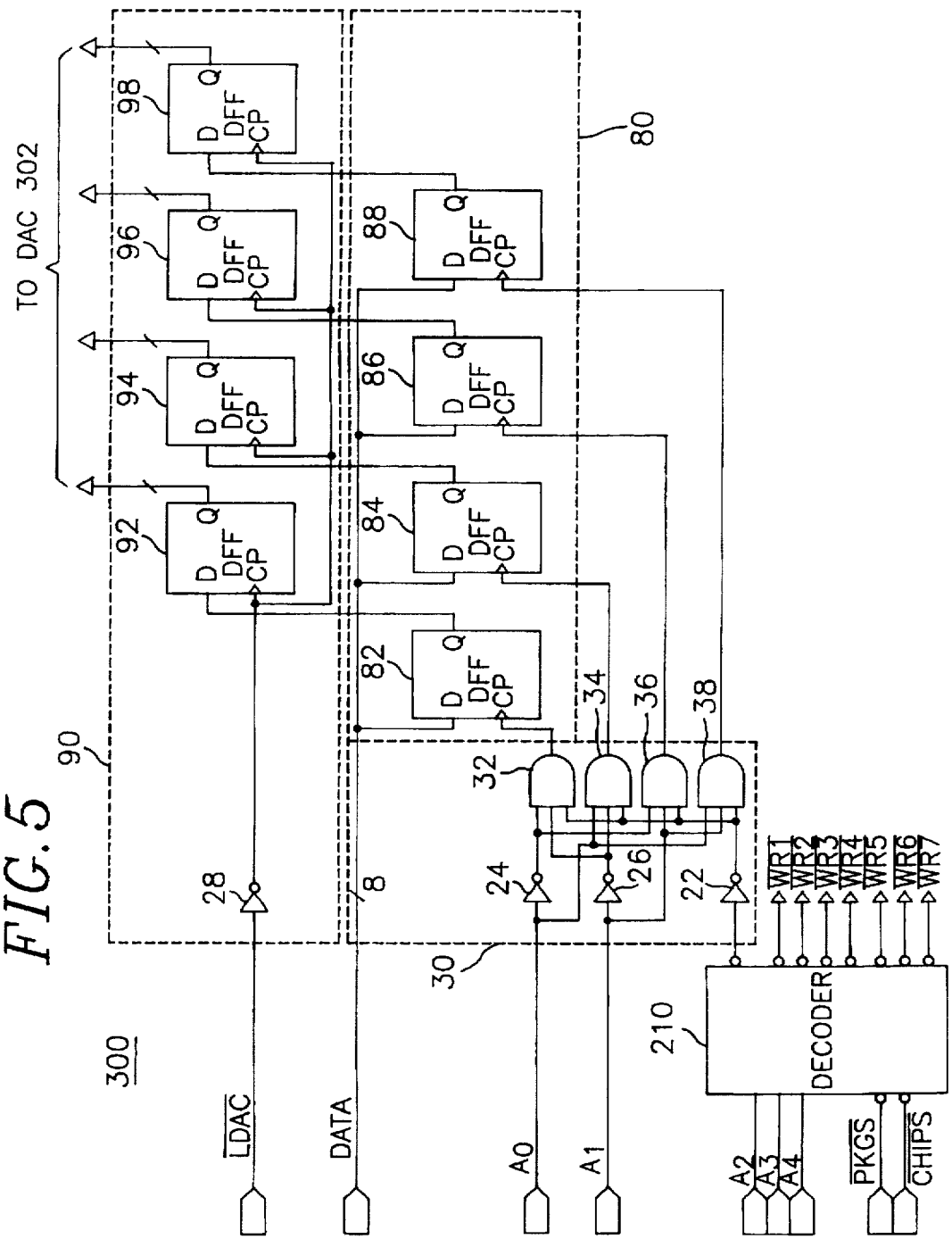
FIG. 5 provides a circuitry diagram of any one of the latch/DAC sections shown in FIG. 4.

FIG. 5 presents a detailed circuit diagram of one, e.g., 300, of the latch circuits shown in FIG. 4.

The latch circuit 300 includes a sequential circuit 30, a data input part 80 and a data output part 90. The data input part 80 has a set of four data input latches 82, 84, 86, 88. Each of the data input latches 82, 84, 86, 88, which is of a conventional D-FF (flip-flop), temporarily stores an 8-bit data signal on the data bus DATA in sequence under the control of the sequential circuit 30. The sequential circuit 30 has three inverters 22, 24, 26 and four AND gates 32, 34, 36, 38. A first inverter 22 inverts the output (/WR0) from the decoder 210; and a second and a third inverters 24 and 26 invert the address signal A0 and A1, respectively.

A first AND gate 32 performs a logic AND operation on the outputs of the inverters 22, 24, 26. The resultant output from the AND gate 32 is provided to a first latch 82 as a control signal to permit the latch 52 to receive a first 8-bit data signal on the data bus DATA.

A second AND gate 34 performs a logic AND operation on the outputs of the inverters 22, 26 and the address signal A0. The resultant output from the AND gate 34 is provided to a second latch 84 as a control signal to permit the latch 84 to receive a second 8-bit data signal on the data bus DATA.

A third AND gate 36 performs a logic AND operation on the outputs of the inverters 22, 24 and the address signal A1. The resultant output from the AND gate 36 is provided to a latch 86 as a control signal to permit the latch 86 to latch a third 8-bit data signal on the data bus DATA.

A fourth AND gate 38 performs a logic AND operation on the output of the inverter 22 and the address signals A0, A1. The resultant output from the AND gate 38 is provided to a fourth latch 88 as a control signal to permit the latch 88 to latch a fourth 8-bit data signal on the data bus DATA.

The data output part 90 includes an inverter 28 for performing an inversion operation for the data control signal /LDAC and a set of four transfer gates 92, 94, 96, 98. Each of the gates 92, 94, 96, 98, which is of a conventional D-FF, serves to output the data signals transmitted from the input latches 82, 84, 86, 88 at the positive going transition of the output of the inverter 28.

The operation of the inventive actuated mirror array driver circuit will be discussed hereinbelow.

When both of the selection signals, /PKGS1 and /CHIPS1, are active low and a code of the address signals (A4A3A2) is (000), the decoder 210 is enabled and then produces the active low /WR0 signal as shown in FIG. 8J. The active low /WR0 signal is inverted by the first inverter 22 and then fed to each of the AND gates 32–38. At this time, if a code of the address signals (A1A0) is (00), the first 8-bit data signal is latched in the first D-FF 82 at the time of a positive going transition of the output from the first AND gate 32; if the address code (A1A0) becomes (01), the second 8-bit data signal is latched in the second D-FF 84 at the time of a positive going transition of the output from the second AND gate 34; if the address code (A1A0) becomes (10), the third 8-bit data signal is latched in the third D-FF 86 at the time of a positive going transition of the output from the third AND gate 36; if the address code (A1A0) becomes (11), the fourth 8-bit data signal is latched in the fourth D-FF 88 at the time of a positive going transition of the output from the fourth AND gate 38.

On the other hand, when the first to fourth 8-bit data signals are onto the D-FFs 82 to 88, as the address code (A4A3A2) becomes (100), the decoder 210 produces the latch enable signal /WR1. In response to the latch enable signal /WR1, the latch circuit 310 shown in FIG. 4 is enabled so that a fifth to an eighth 8-bit data signals are sequentially latched to their corresponding D-FFs, respectively.

The above operation is repeated with respect to a last latch circuit 370 until the 1st to 32th data signals are latched on the latch section 220 shown in FIG. 3.

Similarly, as the remaining modules 202, 204, 206 are sequentially enabled by the selection signals, /PKGS1 and /CHIPS1 to /CHIPS4, an unit of 32 data signals is sequentially stored in the input data latches within the modules 202, 204, 206, respectively. Subsequently, as the five package ICs, 100 to 140, as shown in FIG. 2, are sequentially enabled by the package selection signals, a set of 128 data signals is stored in the input data latches within the package ICs, respectively, to thereby achieve the storage of a total 640 data signals during the duration "A" having the 640 dot clock pulses of the data control signal /LDAC as shown in FIG. 7E.

Thereafter, the 640 data signals latched in the input latches begin simultaneously to be transmitted to the DAC and OP-AMPs, in synchronization with the positive going transition of the inverted data control signal by the inverter 28 via way of the transfer gates. The transmission is completed during the duration "B" as shown in FIG. 7E.

Figure 6:
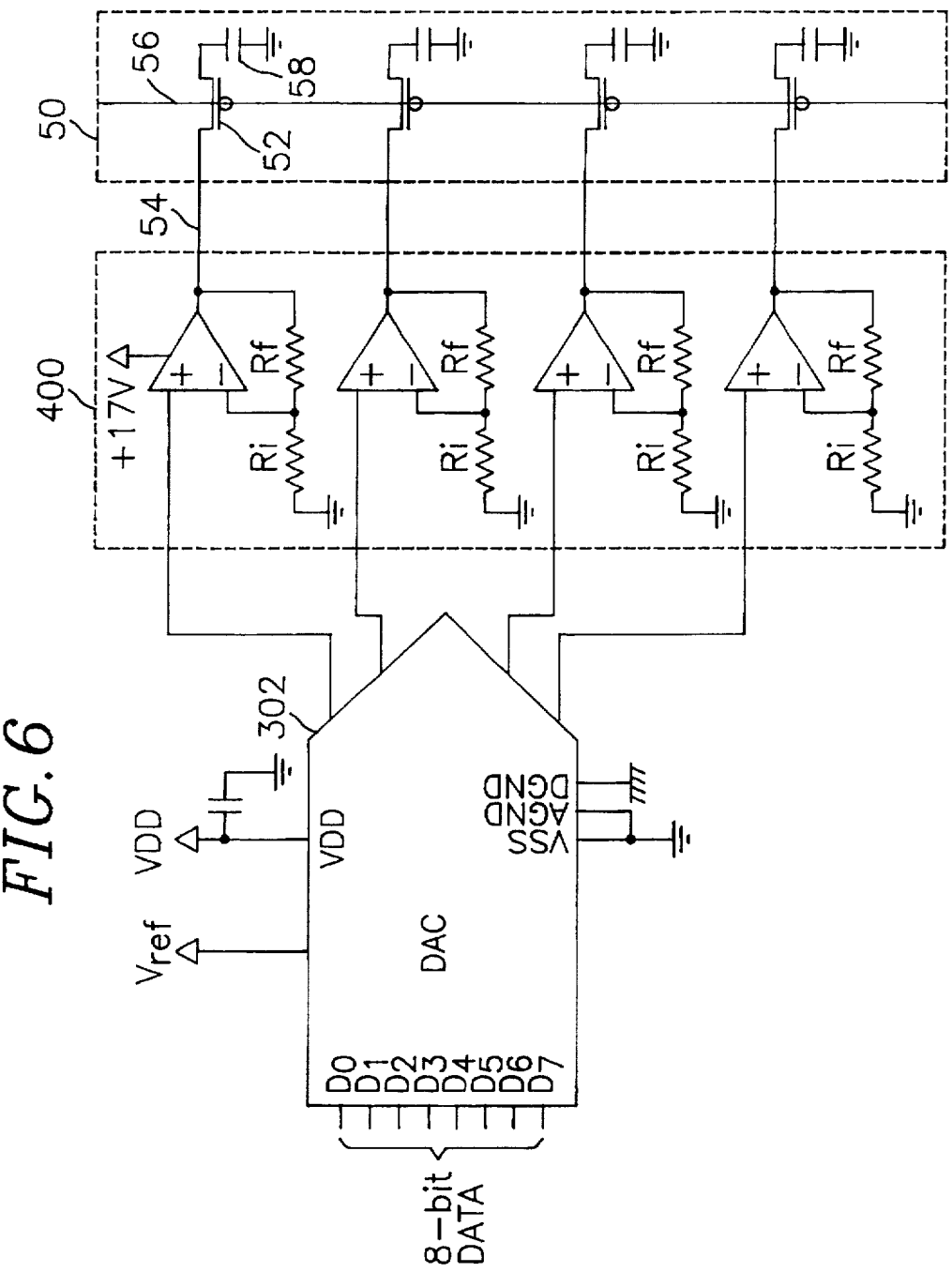
FIG. 6 depicts a circuitry diagram of any one of the DACs shown in FIG. 5.

Referring to FIG. 6, there is shown a circuitry diagram of one, e.g., 400 of the OP-AMP circuits shown in FIG. 4.

Each of the four 8-bit data signals from the D-FFs 92, 94, 96, 98 is applied to input terminals, D0 to D7, of each of the DACs, respectively. There is shown in FIG. 6 only one circuit diagram of DACs, e.g., 302, for the sake of simplicity. The DAC 302 converts it into an analog voltage quantity proportional to the digital value applied thereto. The analog voltage quantity can take on any one of many different gradation values, i.e., 256 (=$2^8$) different values, over a given operating voltage range $V_{ref}$ applied to the DAC 302. The DAC 302 provides the converted analog voltage to its corresponding OP-AMP 400. The OP-AMP 400 serves to amplify the analog voltage quantity to the voltage signal ranging from 0 V to 15 V adapted to drive the AMA 50. The amplified voltage signal is fed to a source of the TFT 52 which is turned on by the select line 56. Accordingly, the actuated mirror 40 associated with the TFT 52 is charged to a level of the amplified voltage signal.

Although the present invention has been shown and described with respect to the particular embodiment only, it will be apparent to those skilled in the art that many changes and modifications may be made without departing from the spirit and scope of the present invention as defined in the appended claims.

What is claimed is:

1. A driving circuit for driving thin film actuated mirrors in a column in an array of M×N thin film actuated mirrors, wherein M and N are integers and indicate column and row in the array, respectively, each of the thin film actuated mirrors being used for reflecting a light beam incident thereupon, each of the thin film actuated mirrors being associated with a switching element, each of the thin film actuated mirrors deforming in response to a signal voltage applied thereto through the switching element as each of the switching elements in the same column is turned on to thereby cause a deviation in the optical path of the reflected light beam therefrom, the driving circuit comprising:

memory means for storing a video signal in the form of a digitized signal, the video signal having a plurality of line video signals, each of the line video signals being scanned in accordance with a scanning pulse, each of the line video signals being divided into said N number of n-bit data signals, each of the N number of the n-bit data signals being sequentially generated from the memory means;

means for deriving from the scanning pulse a clock pulse to drive each of said N number of thin film actuated mirrors in the same column;

means for deriving from the scanning pulse a data control signal having a first pulse followed by a second pulse, each of the first and the second pulses having an associated duration, wherein said N number of n-bit data signals is available during the duration of the first pulse;

means for generating an enable signal; and a plurality of driving means of a substantially identical construction, each of the driving means being sequentially enabled in accordance with the enable signal to individually drive a predetermined number of actuated mirrors within the same column so that it applies individually to the predetermined number of actuated mirrors a corresponding number of the n-bit data signals, wherein each of the driving means includes:

means for generating a sequential signal through the use of the scanning pulse together with the enable signal, the sequential signal being used to permit the corresponding number of n-bit data signals to be received in sequence;

means having a corresponding number of input latches, each of the input latches for temporarily storing one of the corresponding number of n-bit data signals in accordance with the sequential signal;

means having a corresponding number of transfer gates, each of the transfer gates, in synchronization with the transition from the first pulse to the second pulse, simultaneously outputting the n-bit data signal from each of the input latches;

means having a corresponding number of conversion means, each of the conversion means converting the n-bit data signal transferred from each of the transfer gates into an analog voltage quantity which is proportional to the value of the n-bit data signal; and means having a corresponding number of amplifying means, each of the amplifying means amplifying the analog voltage quantity to produce the signal voltage to be applied to each of the predetermined number of the actuated mirrors.

2. The apparatus of claim 1, wherein the conversion means includes a digital-to-analog converter.

3. The apparatus of claim 2, wherein the analog voltage quantity is one of $2^n$ different gradation values over a given operating voltage range applied to the digital-to-analog converter.

* * * * *